United States Patent
Ahn et al.

(10) Patent No.: US 7,428,430 B2
(45) Date of Patent: Sep. 23, 2008

(54) OPEN AND CLOSE APPARATUS OF SLIDE TYPE PORTABLE TERMINAL

(75) Inventors: Byung Jin Ahn, Gyeonggi-Do (KR); Kap Joo Kwon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 10/888,604

(22) Filed: Jul. 9, 2004

(65) Prior Publication Data

US 2005/0009572 A1  Jan. 13, 2005

(30) Foreign Application Priority Data

Jul. 10, 2003  (KR)  ............ 10-2003-0046922

(51) Int. Cl.
*H04M 1/00* (2006.01)
*H05K 7/16* (2006.01)

(52) U.S. Cl. ............ 455/575.4; 455/575.1; 379/433.12; 361/727

(58) Field of Classification Search ............ 455/575.4; 379/433.12; 361/727
See application file for complete search history.

(56) References Cited

U.S. PATENT DOCUMENTS

| | | | | |
|---|---|---|---|---|
| 5,151,946 A * | 9/1992 | Martensson | ............ | 455/575.4 |
| 5,535,071 A * | 7/1996 | Yamagishi et al. | ......... | 360/96.5 |
| 5,783,915 A * | 7/1998 | Shida et al. | ............ | 318/135 |
| 6,141,310 A | 10/2000 | Tanaka et al. | ............ | 369/75.2 |
| 6,397,078 B1 * | 5/2002 | Kim | ............ | 455/556.2 |
| 6,483,445 B1 * | 11/2002 | England | ............ | 341/22 |
| 6,782,242 B1 * | 8/2004 | Koleda et al. | ............ | 455/90.3 |
| 6,822,871 B2 * | 11/2004 | Lee et al. | ............ | 361/727 |
| 6,961,593 B1 * | 11/2005 | Lonka et al. | ............ | 455/573 |
| 6,973,186 B2 * | 12/2005 | Shin | ............ | 379/433.12 |
| 6,980,840 B2 * | 12/2005 | Kim et al. | ............ | 455/575.4 |
| 6,993,128 B2 * | 1/2006 | Eromaki | ............ | 379/433.12 |
| 7,006,015 B2 * | 2/2006 | England | ............ | 341/22 |
| 7,071,916 B2 * | 7/2006 | Duarte et al. | ............ | 345/156 |
| 7,136,688 B2 * | 11/2006 | Jung et al. | ............ | 455/575.4 |
| 7,187,364 B2 * | 3/2007 | Duarte et al. | ............ | 345/168 |
| 7,269,451 B2 * | 9/2007 | Kwon | ............ | 455/575.4 |
| 2001/0009847 A1 * | 7/2001 | Kim et al. | ............ | 455/90 |
| 2003/0003962 A1 | 1/2003 | Vooi-Kia et al. | ............ | 455/566 |
| 2003/0064688 A1 * | 4/2003 | Mizuta et al. | ............ | 455/90 |
| 2005/0221873 A1 * | 10/2005 | Kameyama et al. | ...... | 455/575.4 |

FOREIGN PATENT DOCUMENTS

| | | |
|---|---|---|
| CN | 1416256 | 5/2003 |
| EP | 1 148 692 A2 | 10/2001 |

* cited by examiner

*Primary Examiner*—Duc M Nguyen
(74) *Attorney, Agent, or Firm*—Lee, Hong, Degerman, Kang & Schmadeka

(57) ABSTRACT

An apparatus for opening and closing a slide type portable terminal comprising a guide unit formed between a display unit and a body unit for guiding the display unit to be moved in a longitudinal direction, a driving unit for moving the display unit, and a switching unit for applying a power to the driving unit to move the display unit in the longitudinal direction, wherein the switching unit applies a forward power to the driving unit to move the display unit in an open direction and applies a reverse power to the driving unit to move the display unit in a closed direction.

30 Claims, 12 Drawing Sheets

OPEN AND CLOSE APPARATUS OF SLIDE TYPE PORTABLE TERMINAL

CROSS-REFERENCE TO RELATED APPLICATIONS

Pursuant to 35 U.S.C. § 119(a), this application claims the benefit of earlier filing date and right of priority to Korean Application No. 10-2003-0046922, filed on Jul. 10, 2003, the contents of which are hereby incorporated by reference herein in their entirety.

BACKGROUND OF THE INVENTION

1. Field of the Invention

The present invention relates to an apparatus for opening and closing a slide type portable terminal, and more particularly, to an apparatus of a slide type portable terminal capable of automatically opening and closing a display unit.

2. Description of the Related Art

Generally, portable terminals can be divided into flip types and folder types. In a flip type portable terminal, a cover is rotatably mounted at a body so that an input button region can be opened and closed. In a folder type portable terminal, a folder having an LCD (Liquid Crystal Display) is rotatably mounted at a body having an input region. These types of portable terminals are limited by the size of their displays. Presently, a portable terminal having a large display unit for displaying various information is being required.

Accordingly the use of a slide type portable terminal comprising a display unit having a large LCD for displaying various information and a body unit for inputting information has increased.

Figure 1:
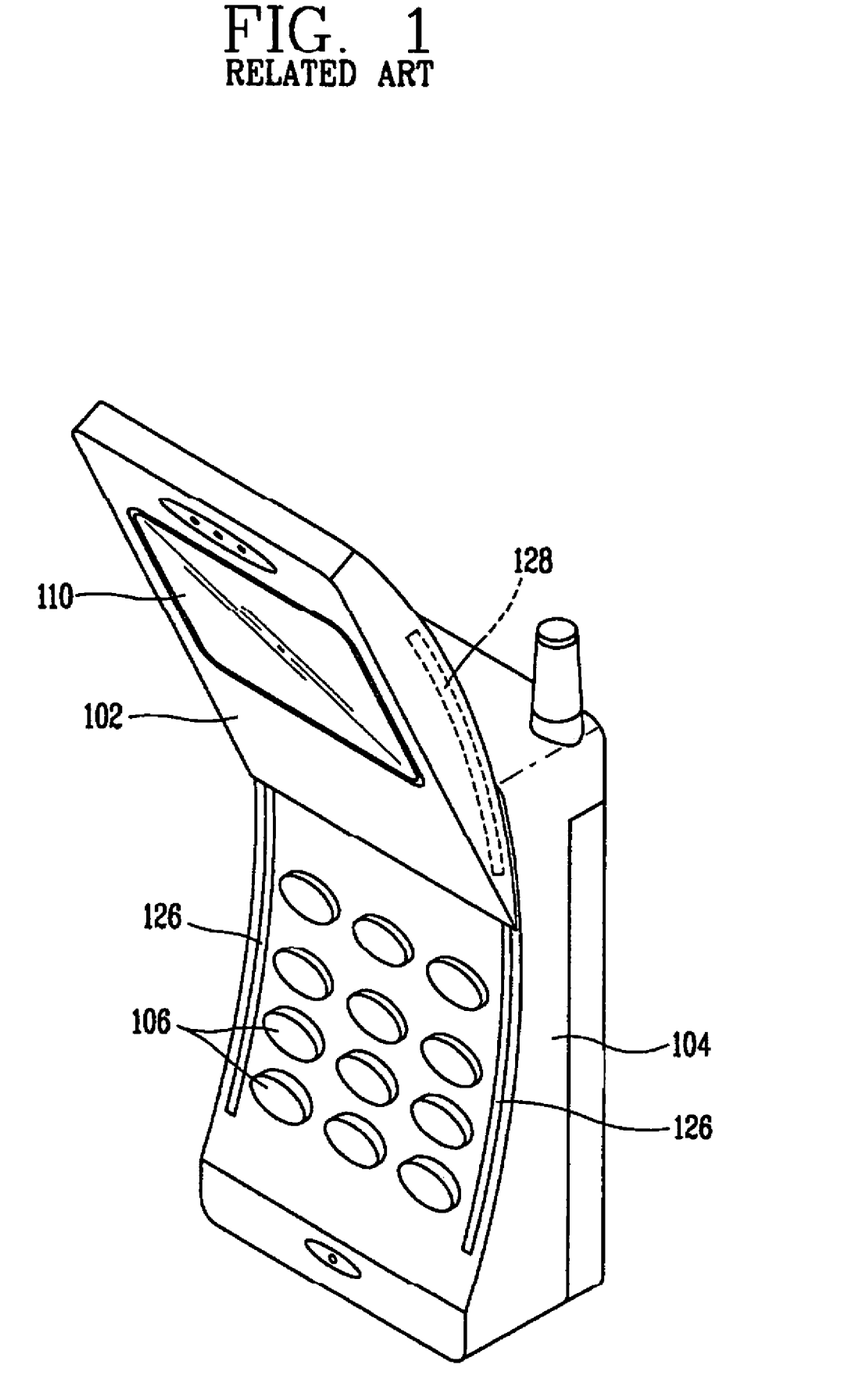
FIG. 1 is a perspective view of a slide type portable terminal in accordance with the related art.

FIG. 1 is a perspective view showing a slide type portable terminal in accordance with the related art.

The related art slide type portable terminal comprises a display unit 102 having an LCD 110 for displaying information, a body unit 104 slidably mounted at the display unit 102 having adjustment keys 106 at a front surface thereof, and sliding units 126 and 128 installed between the display unit 102 and the body unit 104 for slidably opening and closing the display unit 102.

The sliding units 126 and 128 are comprised of a guide groove 126 formed at lateral surfaces of the body unit 104 in a longitudinal direction, and a guide rail 128 formed at an edge of the display unit 102 and inserted into the guide groove 126 to be moved in a longitudinal direction.

The sliding units 126 and 128 of the related portable terminal are opened when the user manually pushes the display unit 102 in an upward longitudinal direction and are closed when the user manually pushes the display unit 102 in a downward longitudinal direction.

However, in the related slide type portable terminal, the user is inconvenienced by having to manually open and close the sliding units by pushing the display unit in an upward or downward longitudinal direction. Thus, what is needed is a slide type portable terminal which eliminates the inconvenience.

SUMMARY OF THE INVENTION

The present invention provides a slide type portable terminal capable of increasing a user's convenience by automatically sliding opened and closed a display unit on a body unit.

To achieve these and other advantages and in accordance with the purpose of the present invention, as embodied and broadly described herein, there is provided an apparatus for opening and closing a slide type portable terminal comprising a guide unit formed between a display unit and a body unit for guiding the display unit to be moved in a longitudinal direction, a driving unit for moving the display unit, and a switching unit for applying a power to the driving unit to move the display unit in the longitudinal direction, wherein the switching unit applies a forward power to the driving unit to move the display unit in an open direction and applies a reverse power to the driving unit to move the display unit in a closed direction.

In one aspect of the invention, the guide unit comprises a guide groove formed at a rear surface of the display unit in the longitudinal direction, and a guide hook formed at a front surface of the body unit and slidably coupled to the guide groove, wherein the guide hook moves along the guide groove in the longitudinal direction.

In another aspect of the invention, the driving unit comprises a driving motor mounted at the body unit for generating a rotative force when the power is applied, a pinion gear rotatably mounted at a rotational shaft of the driving motor wherein the pinion gear rotates when the rotative force is generated, and a rack gear formed at a rear surface of the display unit in the longitudinal direction and engaging the pinion gear, wherein the display unit moves in the longitudinal direction upon the rotating pinion gear moving the engaged rack gear when the rotative force is generated.

In a further aspect of the invention, the switching unit comprises a first switch operation groove formed at a rear surface of the display unit, a second switch operation groove formed at the rear surface of the display unit, and a driving switch mounted at an upper front surface of the body unit for turning a power source on and off.

In a detailed aspect of the invention, the driving switch comprises a switch lever mounted at the upper front surface of the body unit, a first movable terminal connected to a rear surface of the switch lever for applying a forward power to the driving motor when the switch lever is inclined in a first direction, and a second movable terminal connected to the rear surface of the switch lever for applying a reverse power to the driving motor when the switch lever is inclined in a second direction.

In yet another aspect of the invention, a method for opening and closing a slide type portable terminal comprises applying a power to a driving unit, guiding a display unit to move about a body unit in a longitudinal direction, and moving the display unit using the driving unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The present invention relates to an apparatus of a slide type portable terminal capable of automatically opening and closing a display unit.

Figure 2:
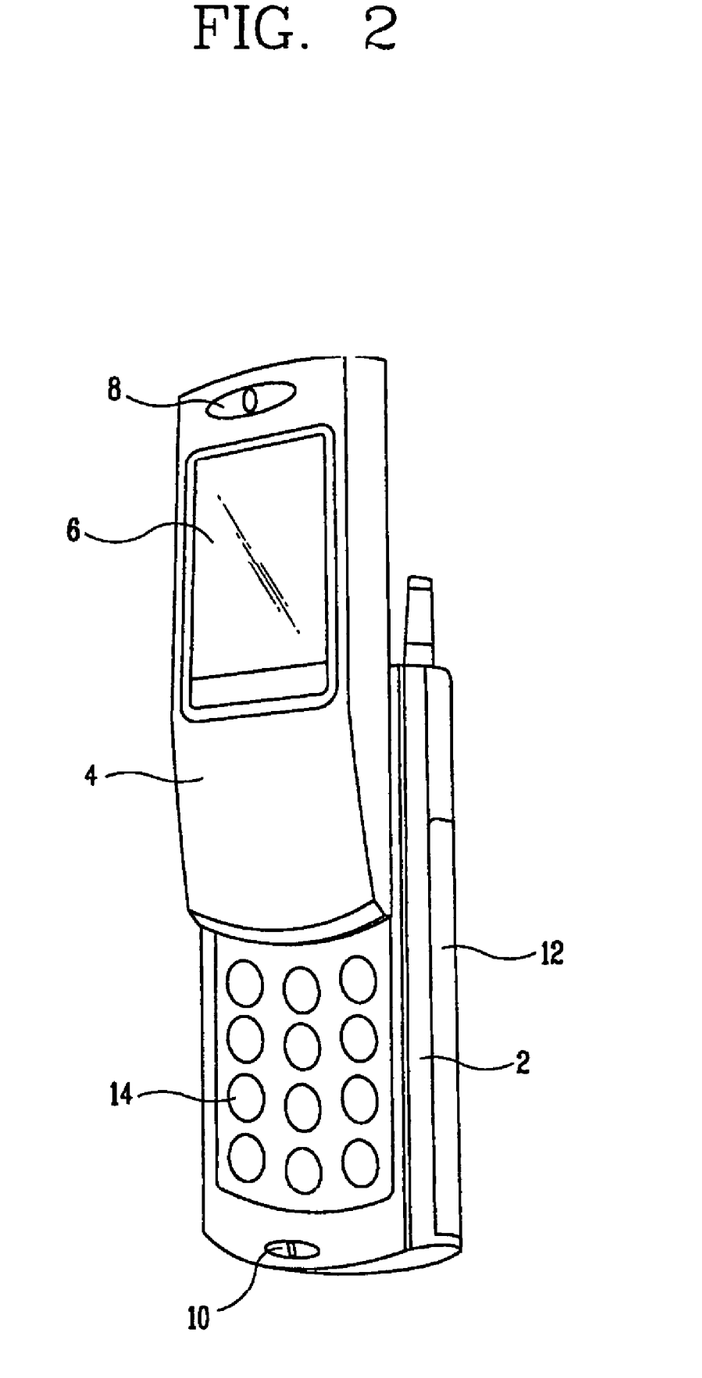
FIG. 2 is a perspective view of a slide type portable terminal according to one embodiment of the present invention.
Figure 3:
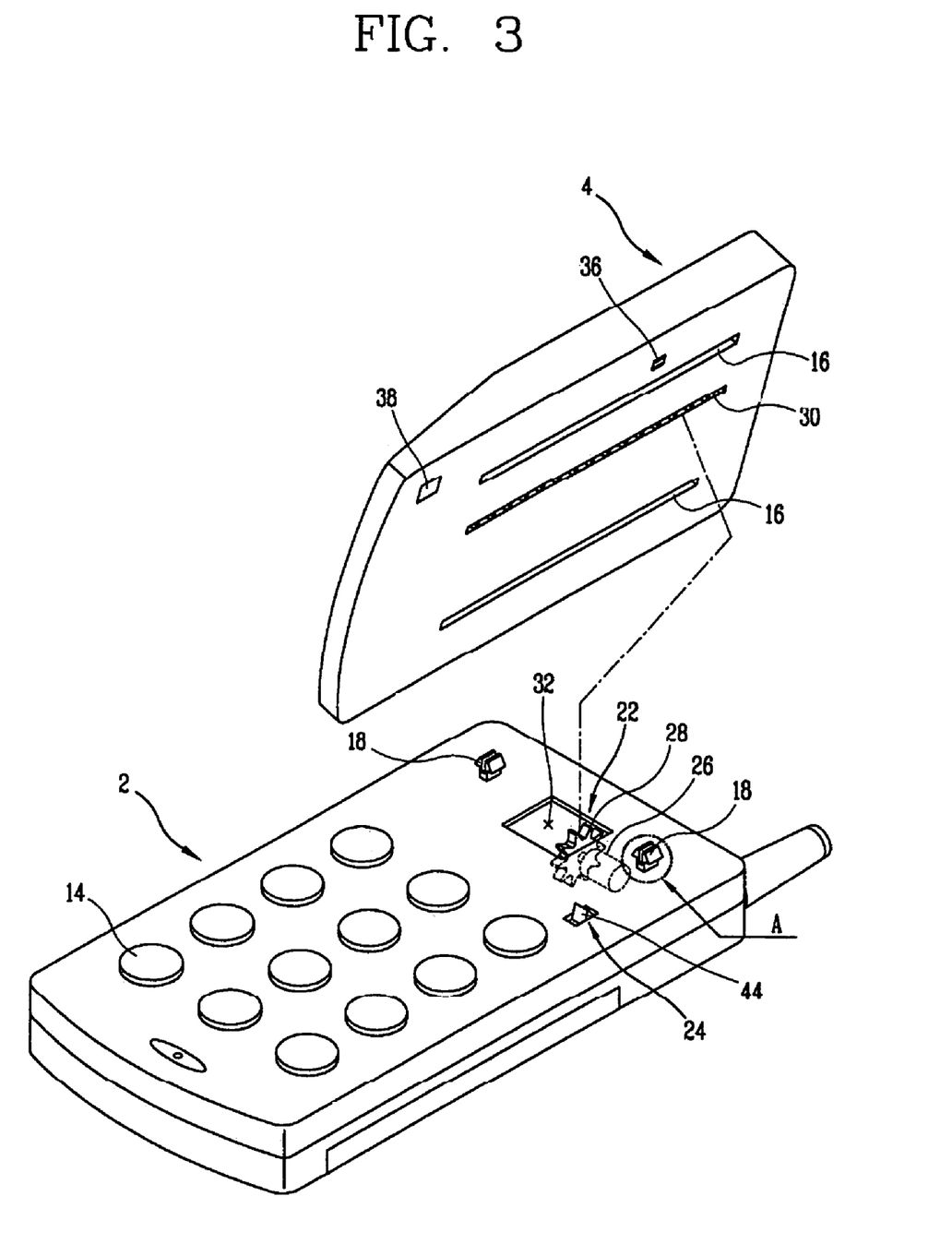
FIG. 3 is a disassembled perspective view of the slide type portable terminal according to one embodiment of the present invention.
Figure 4:
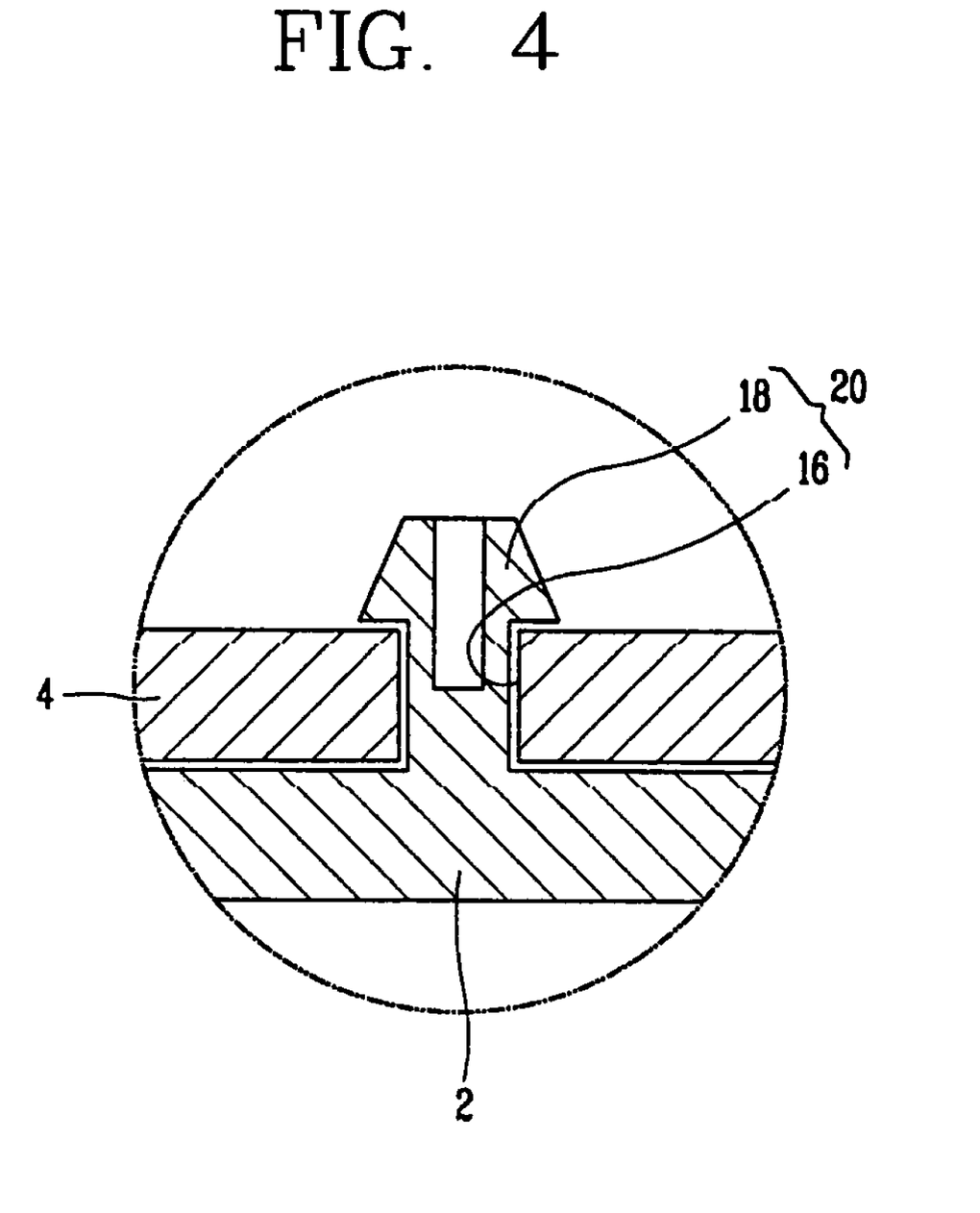
FIG. 4 is an enlargement view of 'A' in FIG. 3.

Referring to FIGS. 2-4, a slide type portable terminal according to an embodiment of the present invention comprises a body unit 2 provided with adjustment keys 14, a display unit 4 slidably mounted at the body unit 2 and having an display 6 for displaying image information, and a slide apparatus for automatically opening and closing the display unit 4.

A speaker 8 is installed at a front surface of the display unit 4, a microphone 10 is installed at a front surface of the body unit 2, and a battery 12 is installed at a rear surface of the body unit 2.

The slide apparatus preferably comprises a guide unit 20 formed between the rear surface of the display unit 4 and the front surface of the body unit 2 for guiding the display unit 4 to be moved in a longitudinal direction, a driving unit 22 for generating a driving force so that the display unit 4 can be moved, and a switching unit 24 for turning on and off the driving unit 22 by a user's adjustment.

The guide unit 20 preferably comprises guide grooves 16 formed at a rear surface of the display unit 4 in a longitudinal direction and a guide hook 18 formed at a front surface of the body unit 2 slidably coupled to the guide groove 16 for moving along the guide groove 16 in the longitudinal direction.

As shown in FIG. 4, the guide hook 18 is protruded from the front surface of the body unit 2 and an end portion thereof diverges to both sides. Preferably, the guide hook 18 is formed of an elastic material to prevent it from being detached from an inner side surface of the guide groove 16 when inserted.

Referring back to FIG. 3, the driving unit 22 preferably comprises a driving motor 26 mounted at the body unit 2 for generating a rotative force when a power is applied, a pinion gear 28 mounted at a rotational shaft of the driving motor 26 and arranged to expose a part thereof through the front surface of the body unit 2, wherein the pinion gear rotates when the rotative force is applied thereto, and a rack gear 30 formed at the rear surface of the display unit 4 in a longitudinal direction and engaging the pinion gear 28, wherein the display unit 4 moves in the longitudinal direction upon the rotating pinion gear moving the engaged rack gear when the rotative force is generated. A penetration hole 32 for exposing the pinion gear 28 through the front surface of the body unit 2 is formed at the upper front surface of the body unit 2.

In the driving unit 22, when a forward power is applied to the driving motor 26, the pinion gear 28 is rotated in a forward direction, the rack gear 30 gear-coupled to the pinion gear 28 is linearly-moved, and the display unit 4 is opened. Also, when a reverse power is applied to the driving motor 26, the pinion gear 28 is rotated in a reverse direction, the rack gear 30 is linearly-moved in a reverse direction, and the display unit 4 is closed.

Figure 5:
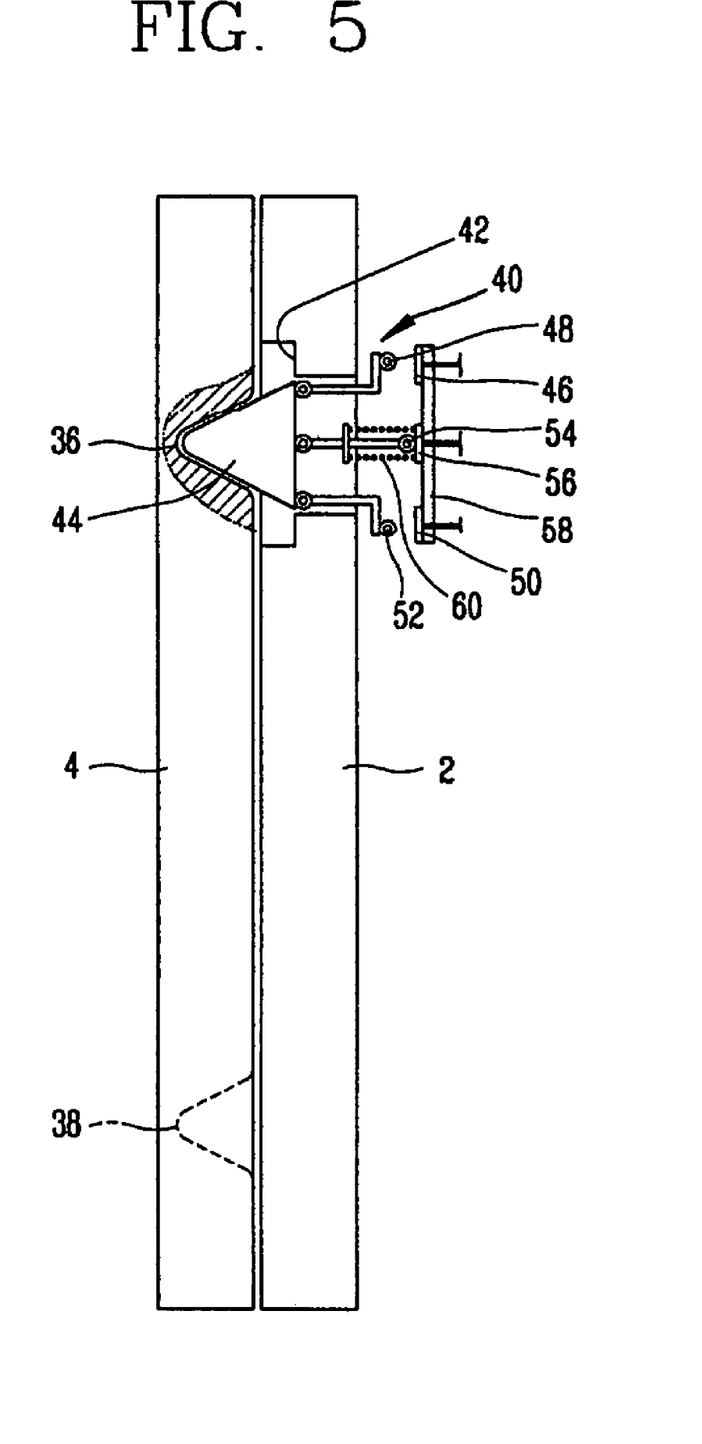
FIG. 5 is a lateral view showing a switching unit of an apparatus of the slide type portable terminal according to one embodiment of the present invention.

As shown in FIGS. 3 and 5, the switching unit 24 preferably comprises a first switch operation groove 36 formed at a rear surface of the display unit 4, a second switch operation groove 38 formed at a rear surface of the display unit 4, and a driving switch 40 mounted at an upper front surface of the body unit 2 for turning off a power source when the driving switch is inserted into either of the first switch operation groove 36 and the second switch operation groove 38 and for turning on a power source when the driving switch 40 is not inserted into either of the first and second switch operation grooves 36 and 38.

The first switch operation groove 36 is formed at a position on the rear surface of the display unit 4 such that when the driving switch 40 is inserted, the display unit 4 is closed. The second switch operation groove 38 is formed at a position on the rear surface of the display unit 4 such that when the driving switch 40 is inserted, the display unit 4 is open to the maximum. As described, the display unit 4 is preferably slid in an upward direction to open the portable terminal and slid in a downward direction to close the portable terminal. It is contemplated, however, that the opened and closed positions of the display unit may be reversed such that a user may slide the display unit 4 downward to open the portable terminal and slide the display unit 4 upward to close the portable terminal. Furthermore, although only two switch operation grooves are depicted in the figures, it is contemplated that any number of switch operation grooves may be formed on the rear surface of the display unit 4 for turning off a power source when the driving switch 40 is inserted thereto.

The driving switch 40 preferably comprises a switch lever 44 mounted at an upper front surface of the body unit 2 in an insertion groove 42 and protruded out of the front surface of the body unit 2 with a certain height, a first movable terminal 48 connected to a rear surface of the switch lever 44 and linearly-moved when the switch lever 44 is inclined upwardly thereby to be in contact with a first fixed terminal 46, and a second movable terminal 52 connected to a rear surface of the switch lever 44 and linearly-moved when the switch lever 44 is inclined downwardly thereby to be in contact with a second fixed terminal 50.

A ground movable terminal 54 is also connected to a rear surface of the switch lever 44. When the switch lever 44 is positioned in an upright state, the ground movable terminal 54 is in contact with a ground fixed terminal 56. The first fixed terminal 46, the second fixed terminal 50, and the ground fixed terminal 56 are supported by a supporting plate 58.

A spring 60 is installed between the supporting plate 58 and the switch lever 44 to provide an elastic force to the switch lever 44.

The switch lever 44 has a sectional surface of a triangle shape. When the switch lever 44 is inserted into the first switch operation groove 36 and the second switch operation groove 38, the ground movable terminal 54 and the ground fixed terminal 56 come in contact with each other and a power source is turned off. Further, when the user pushes the display unit 4 in an open direction, the switch lever 44 is upwardly inclined. When the first movable terminal 48 and the first fixed terminal 46 come in contact with each other because of the upwardly inclined switch lever 44, a forward power source is applied to the driving motor 26. When the user pushes the display unit 4 in a closed direction, the switch lever 44 is downwardly inclined. Likewise, when the second movable terminal 52 and the second fixed terminal 50 come in contact with each other due to the downwardly inclined switch lever 44, a reverse power source is applied to the driving motor 26.

Operation of the slide type portable terminal according to an embodiment of the present invention will be explained as follows.

As shown in FIG. 5, when the display unit 4 is closed, the switch lever 44 is inserted into the first switch operation groove 36 to be positioned in an upright state. At this time, the ground movable terminal 54 and the ground fixed terminal 56 come in contact with each other causing the power source to be shielded.

Figure 6:
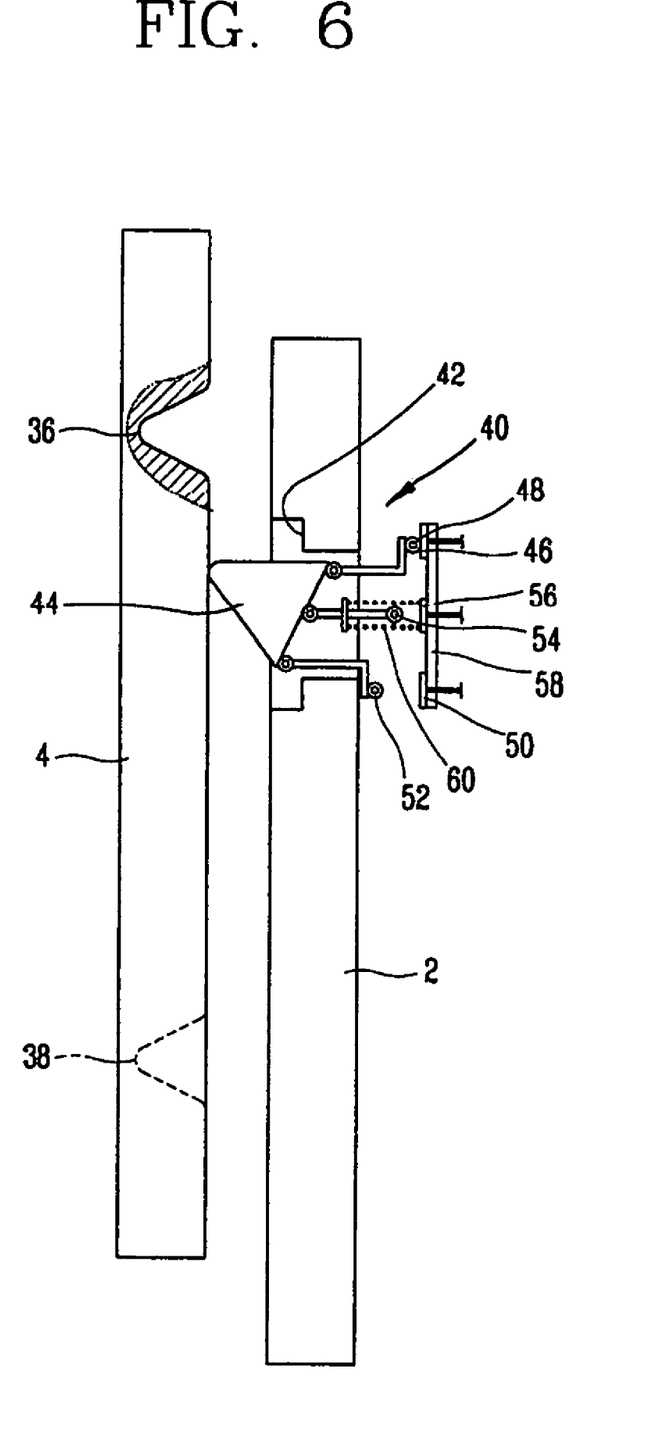
FIGS. 6 to 8 are operational state views of the apparatus of the slide type portable terminal according to one embodiment of the present invention.

When the user pushes the display unit 4 in an open direction in order to use the portable terminal, as shown in FIG. 6, the switch lever 44 is detached from the first switch operation groove 36 and comes in contact with the rear surface of the display unit 4 and is thus upwardly inclined. Consequently, the ground movable terminal 54 and the ground fixed terminal 56 are separated from each other and the first movable terminal 48 and the first fixed terminal 46 come in contact with each other to thereby apply a forward power to the driving motor 26.

When a forward power is applied to the driving motor 26, the pinion gear 28 is rotated, the rack gear 30 engaged to the pinion gear 28 is linearly-moved, and the display unit 4 where the rack gear 30 is mounted is longitudinally moved in an open direction.

Figure 7:
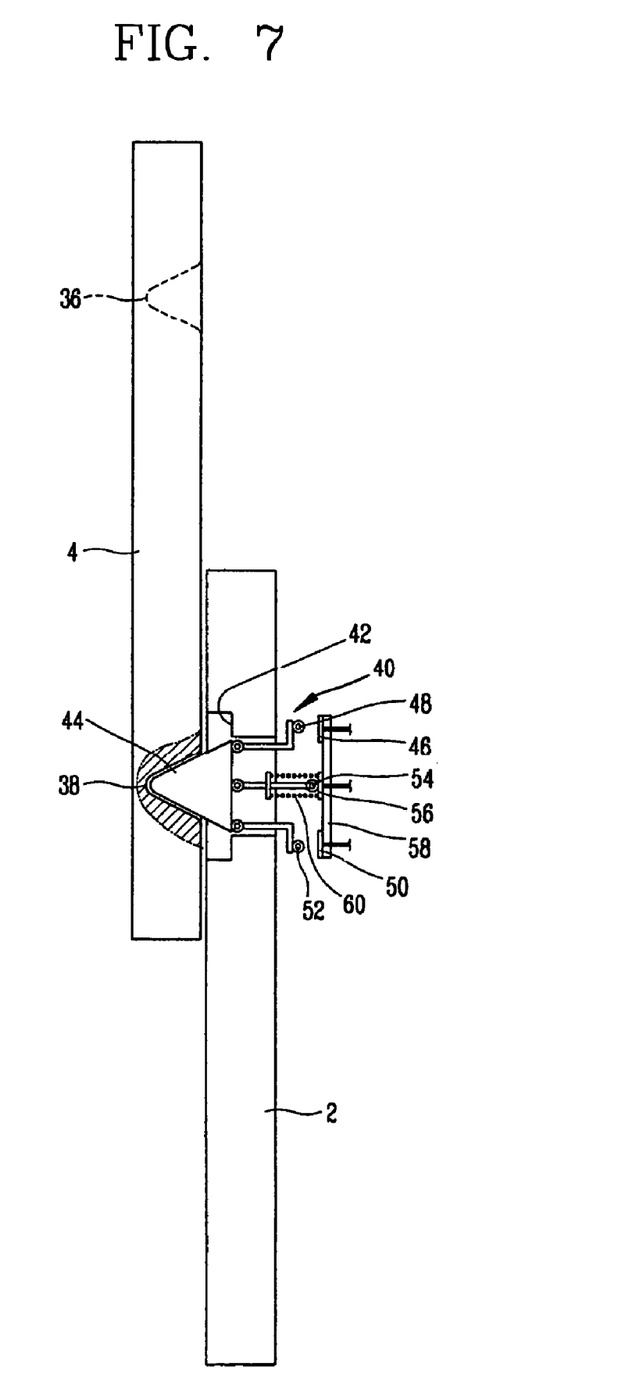

As the display unit 4 is continuously moved, the switch lever 44 is accordingly inserted into the second switch operation groove 38. As shown in FIG. 7, the switch lever 44 is positioned in an upright state, the first movable terminal 48 is detached from the first fixed terminal 46, and a power source to the driving motor 26 is shielded. At this time, the display unit 4 is in a maximum opened position.

Figure 8:
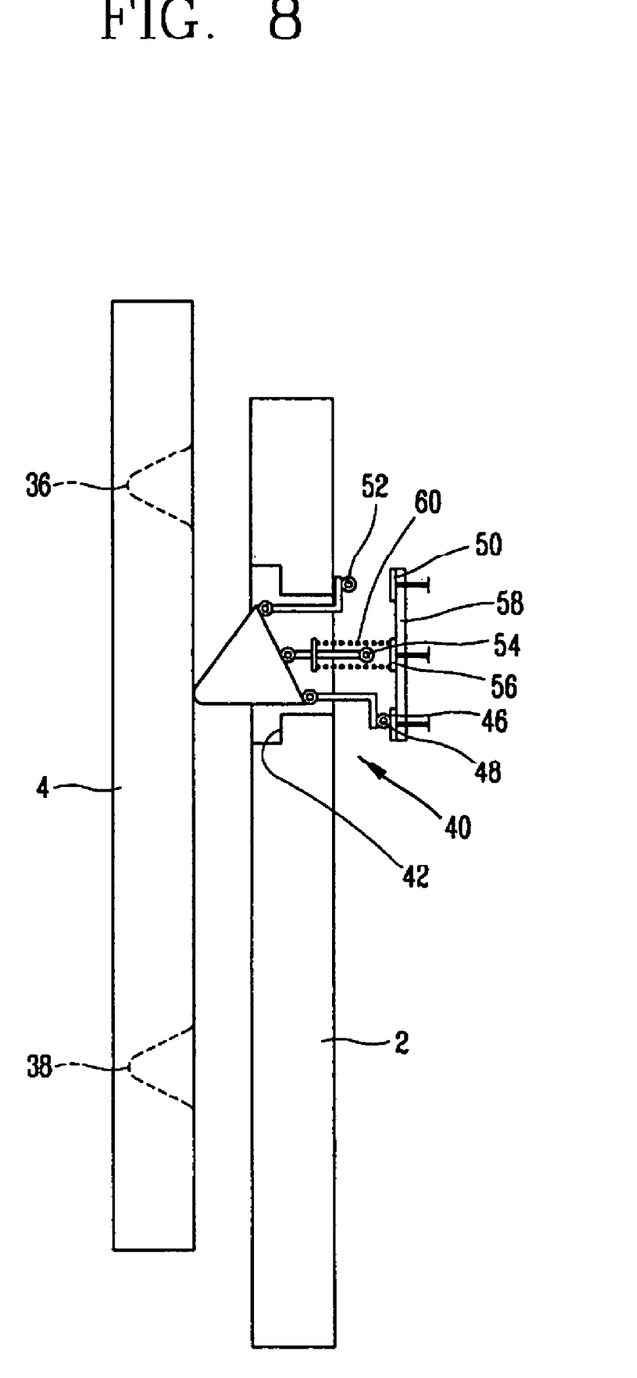

Under this state, when the user pushes the display unit 4 in a closed direction after using the portable terminal, as shown in FIG. 8, the switch lever 44 is detached from the second switch operation groove 38 and is downwardly inclined. The second movable terminal 52 is linearly moved to contact the second fixed terminal 50. Accordingly, a reverse power source is applied to the driving motor 26 resulting in the pinion gear 28 being rotated in a reverse direction, thereby linearly moving the rack gear 30 to move the display unit 4 in a closed direction.

When the switch lever 44 is ultimately inserted into the first switch operation groove 36 as the display unit 4 is moved in the closed direction, a power supply to the driving motor 26 is shielded and the display unit 4 maintains a closed state.

Figure 9:
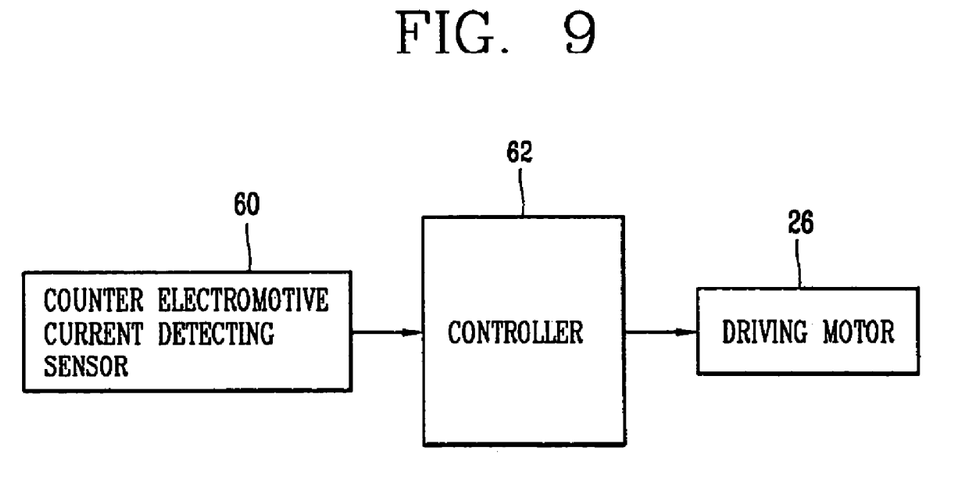
FIG. 9 is a block diagram showing a switching unit of an apparatus of a slide type portable terminal according to a second embodiment of the present invention.

As shown in FIG. 9, the switch unit of an apparatus of a slide type portable terminal according to a second embodiment of the present invention preferably comprises a counter electromotive current detecting sensor 60 for detecting a counter electromotive current generated when a rotor of the driving motor 26 is forcibly rotated and a controller 62 for driving the driving motor 26 in a forward direction or a reverse direction according to a signal applied from the counter electromotive current detecting sensor 60.

Figure 10:
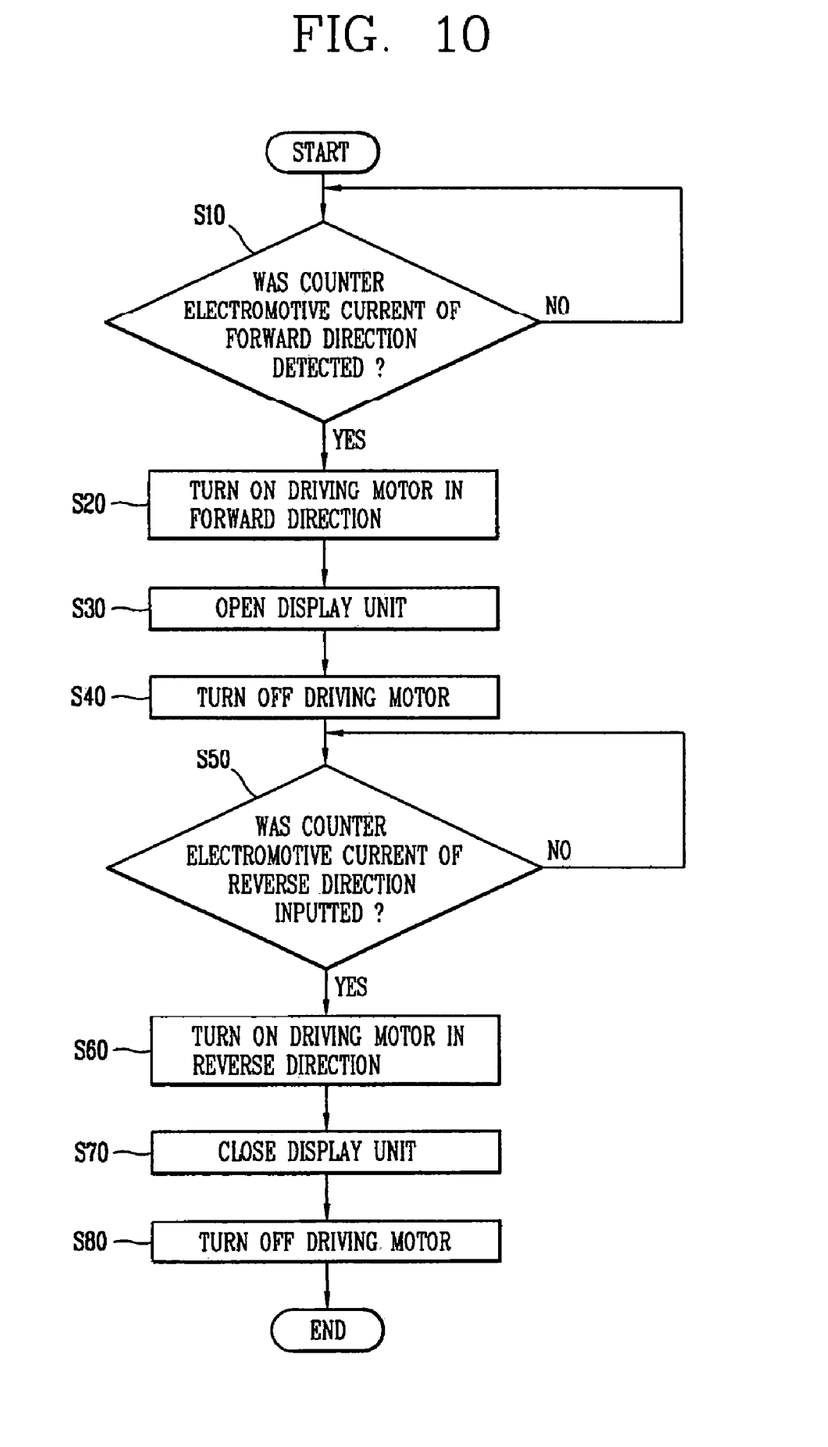
FIG. 10 is a flow chart showing a control order of the apparatus of the slide type portable terminal according to the second embodiment of the present invention.

Operation of the switch unit according to the second embodiment will be explained with reference to FIG. 10. When the user pushes the display unit 4 in an open direction, the rack gear 30 mounted at the display unit 4 and the pinion gear 28 engaged to the rack gear 30 are moved. Accordingly, a rotor of the driving motor 26 is forcibly rotated, and a counter electromotive voltage is generated at a winding coil that winds the periphery of the rotor in proportion to the rotation speed. The generated counter electromotive current is detected by the counter electromotive current detecting sensor 60 causing a signal to be applied to the controller 62 (S10).

Subsequently, the controller 62 applies a forward power to the driving motor 26 to drive the driving motor 26 in a forward direction (S20) and cause the display unit 4 to automatically open (S30).

When the display unit 4 is in a maximum open state, a power applied to the driving motor is shielded by a power shielding means and the display unit maintains its open state. The power shielding means is installed between the display unit and the body unit and is switched on when the display unit is in a maximum open state to shield a power source (S40).

When the user pushes the display unit 4 in a closed direction after using the portable terminal, a counter electromotive current in the reverse direction is detected by the counter electromotive current detecting sensor 60 and a signal is applied to the controller 62. The controller 62 then applies a reverse current to the driving motor 26 to drive the driving motor 26 in a reverse direction to automatically close the display unit 4 (S50, S60).

When the display unit 4 is completely closed, a power applied to the driving motor 26 is shielded by the power shielding means (S70, S80).

Figure 11:
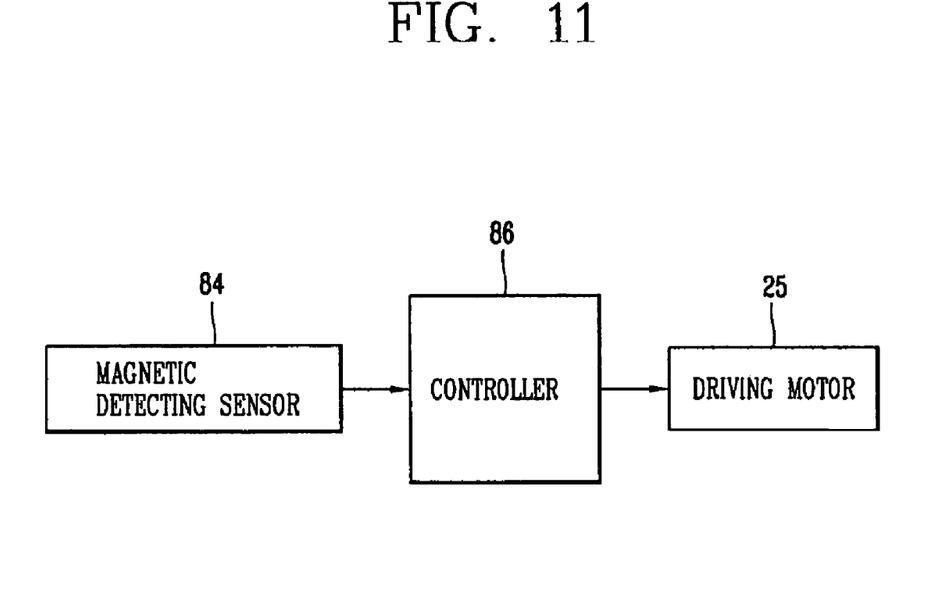
FIG. 11 is a block diagram showing a switching unit of an apparatus of a slide type portable terminal according to a third embodiment of the present invention.
Figure 12:
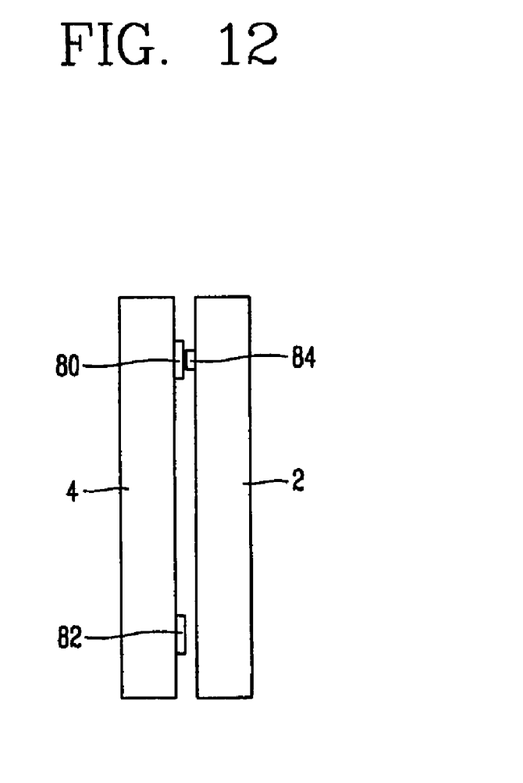
FIGS. 12 to 14 are operational state views of the apparatus of the slide type portable terminal according to the third embodiment of the present invention.

As shown in FIGS. 11 and 12, the switch unit of an apparatus of a slide type portable terminal according to a third embodiment of the present invention preferably comprises a first magnet 80 and a second magnet 82 spaced apart and mounted at a rear surface of the display unit 4 in a longitudinal direction, a magnetic detecting sensor 84 mounted at a front surface of the body unit 2 opposite to either the first magnet 80 and the second magnet 82 for detecting a magnetic force of the first and second magnets 80 and 82, and a controller 86 for driving the driving motor 26 in a forward direction or a reverse direction by a signal applied from the magnetic detecting sensor 84.

Operation of the switch unit of the apparatus of the slide type portable terminal according to, the third embodiment will be explained. As shown in FIG. 12, when the display unit 4 is in a closed state, the magnetic detecting sensor 84 is arranged to be opposite to the first magnet 80 to detect a magnetic force of the first magnet 80. In this state, the controller 86 maintains an OFF state of the driving motor 26.

Figure 13:
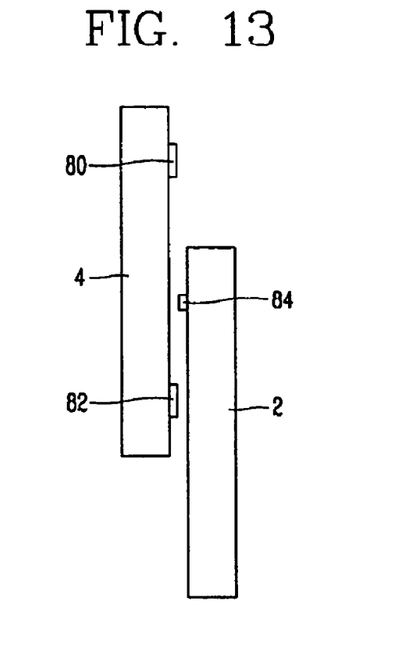

When the user pushes the display unit 4 in an open direction, as shown in FIG. 13, a gap between the magnetic detecting sensor 84 and the first magnet 80 becomes wide and the magnetic detecting sensor 84 does not detect a magnetic force. At this time, a signal from the magnetic sensor 84 is applied to the controller 86 to drive the driving motor 26 in a forward direction to automatically open the display unit 4.

Figure 14:
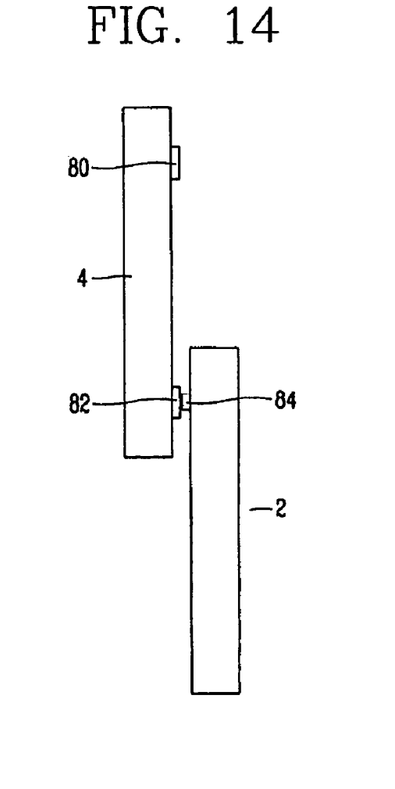

When the display unit 4 is in a maximum open state, as shown in FIG. 14, the magnetic detecting sensor 84 is arranged to be opposite to the second magnet 82 to detect a magnetic force. When the magnetic force is detected, a signal is applied to the controller 86 to stop the driving motor 26 and thereby maintain the open state of the display unit 4.

When the user pushes the display unit 4 in a closed direction after using the portable terminal, the magnetic detecting sensor 84 becomes separated from the second magnet 82 and cannot detect a magnetic force. At this time, the magnetic detecting sensor 84 applies a signal to the controller 86 to drive the driving motor 26 in a reverse direction. This provides a driving force by which the display unit 4 is closed. When the magnetic detecting sensor 84 is arranged to be opposite to the first magnet 80, the magnetic detecting sensor 84 detects a magnetic force and thus applies a signal to the controller 86 to turn off the driving motor 26 and thereby maintain the closed state of the display unit 4.

As described, the display unit 4 is preferably slid in an upward direction to open the portable terminal and slid in a downward direction to close the portable terminal. It is contemplated, however, that the opened and closed positions of the display unit may be reversed such that a user may slide the display unit 4 downward to open the portable terminal and slide the display unit 4 upward to close the portable terminal. Furthermore, although only two magnets are depicted in the figures, it is contemplated that any number of magnets may be formed on the rear surface of the display unit 4 for turning off a power source when the magnetic detecting sensor 84 detects a magnetic force from such magnets.

In the apparatus of a slide type portable terminal according to the present invention, when the user pushes the display unit in an open direction, the switch unit is operated to drive the driving motor in a forward direction and to automatically open the display unit. Further, when the user pushes the display unit in a closed direction, the switch unit is operated to drive the driving motor in a reverse direction to automatically close the display unit. Accordingly, the user's convenience is increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for opening and closing a slide type portable terminal, comprising:
    a guide unit formed between a display unit and a body unit for guiding the display unit to move in a longitudinal direction, the guide unit comprising a guide groove formed at a rear surface of the display unit in the longitudinal direction and slidably coupled to a guide hook protrudingly formed at a front surface of the body unit, wherein the display unit moves along the guide groove into which the guide hook is inserted;
    a driving unit for moving the display unit; and
    a switching unit for detecting movement of the display unit and applying a power to the driving unit to move the display unit,
    wherein when the display unit reaches a maximum opened or closed position, the switching unit detects the position of the display unit to turn off the power applied to the driving unit.

2. The apparatus of claim 1, wherein the switching unit applies a forward power to the driving unit to move the display unit in an open direction and applies a reverse power to the driving unit to move the display unit in a closed direction.

3. The apparatus of claim 1, wherein the guide hook comprises an elastic material.

4. The apparatus of claim 1, wherein the driving unit comprises:
    a driving motor mounted at the body unit for generating a rotative force when the power is applied;
    a pinion gear rotatably mounted at a rotational shaft of the driving motor wherein the pinion gear rotates when the rotative force is generated; and
    a rack gear formed at the rear surface of the display unit in the longitudinal direction and engaging the pinion gear.

5. The apparatus of claim 4, wherein the display unit moves in the longitudinal direction upon the rotating pinion gear moving the engaged rack gear when the rotative force is generated.

6. The apparatus of claim 1, wherein the switching unit comprises:
    at least one switch operation groove formed at the rear surface of the display unit; and
    a driving switch mounted at an upper front surface of the body unit for turning a power source on and off.

7. The apparatus of claim 6, wherein the driving switch turns off a power source when the driving switch is inserted into the at least one switch operation groove and turns on a power source when the driving switch is not inserted into the at least one switch operation groove.

8. The apparatus of claim 1, wherein the driving switch operates the driving motor in a forward direction and a reverse direction when the driving switch is not inserted into the at least one switch operation groove.

9. The apparatus of claim 1, wherein at least one switch operation groove is formed at a position on the rear surface of the display unit such that when the driving switch is inserted into the at least one switch operating groove, the display unit is in a closed position.

10. The apparatus of claim 1, wherein at least one switch operation groove is formed at a position on the rear surface of the display unit such that when the driving switch is inserted into the at least one switch operating groove, the display unit is in an open position.

11. The apparatus of claim 1, wherein the driving switch comprises:
    a switch lever mounted at an upper front surface of the body unit;
    a first movable terminal connected to a rear surface of the switch lever for applying a forward power to the driving motor when the switch lever is inclined in a first direction; and
    a second movable terminal connected to the rear surface of the switch lever for applying a reverse power to the driving motor when the switch lever is inclined in a second direction.

12. The apparatus of claim 11, wherein the driving switch further comprises:
    a first fixed terminal, wherein when the first movable terminal contacts the first fixed terminal, a forward power is applied to the driving motor; and a second fixed terminal, wherein when the second movable terminal contacts the second fixed terminal, a reverse power is applied to the driving motor.

13. The apparatus of claim 12, further comprising:
a supporting plate for supporting the first and the second fixed terminals; and
a spring installed between the supporting plate and the switch lever for providing an elastic force to the switch lever.

14. The apparatus of claim 11, wherein the driving switch further comprises a ground movable terminal connected to the rear surface of the switch lever for turning off the power source when the switch lever is in an upright position.

15. The apparatus of claim 14, wherein the driving switch further comprises a ground fixed terminal, wherein when the ground movable terminal contacts the ground fixed terminal, the power source is turned off.

16. The apparatus of claim 1, wherein the switching unit comprises:
a counter electromotive current detecting sensor; and
a controller.

17. The apparatus of claim 16, wherein the counter electromotive current detecting sensor detects a counter electromotive current generated when a rotor of a driving motor is forcibly rotated and applies a signal to the controller to drive the driving motor.

18. The apparatus of claim 17, wherein the rotor of the driving motor is forcibly rotated when the display unit is pushed to move in the longitudinal direction.

19. The apparatus of claim 1, wherein the switching unit comprises:
at least one magnet mounted at the rear surface of the display unit;
a magnetic detecting sensor mounted at the front surface of the body unit; and
a controller.

20. The apparatus of claim 19, wherein the magnetic detecting sensor is opposite to the at least one magnet for detecting a magnetic force of the at least one magnet.

21. The apparatus of claim 20, wherein the at least one magnet is mounted at a position such that the display unit is closed when arranged to be opposite to the magnetic detecting sensor.

22. The apparatus of claim 20, wherein the at least one magnet is mounted at a position such that the display unit is open when arranged to be opposite to the magnetic detecting sensor.

23. The apparatus of claim 19, wherein a signal from the magnetic detecting sensor is applied to the controller to drive a driving motor when the magnetic detecting sensor does not detect a magnetic force of the at least one magnet.

24. The apparatus of claim 19, wherein a signal from the magnetic detecting sensor is applied to the controller to turn off a driving motor when the magnetic detecting sensor detects a magnetic force of the at least one magnet.

25. A method for opening and closing a slide type portable terminal, the method comprising:
detecting movement and position of a display unit;
applying a power to a driving unit;
guiding the display unit to move about a body unit in a longitudinal direction;
moving the display unit using the driving unit; and
turning off the power applied to the driving unit when the display unit is detected to reach a maximum opened or closed position, wherein:
the display unit comprises a guide groove formed at a rear surface to move in a longitudinal direction;
the body unit comprises a guide hook protrudingly formed at a front surface; and
the display unit moves along the guide groove slidably coupled to the guide hook which is inserted into the guide groove.

26. The method of claim 25, further comprising applying a forward power to the driving unit to move the display unit in an open direction and applying a reverse power to the driving unit to move the display unit in a closed direction.

27. The method of claim 25, further comprising:
generating a rotative force with a driving motor when the power is applied;
rotatating a pinion gear rotatably mounted at a rotational shaft of the driving motor; and
moving a rack gear engaged to the pinion gear and formed at the rear surface of the display unit in the longitudinal direction.

28. The method of claim 25, further comprising:
turning off a power source when a driving switch is inserted into at least one switch operation groove; and
turning on a power source when the driving switch is not inserted into the at least one switch operation groove.

29. The method of claim 25, further comprising:
detecting a counter electromotive current generated when a rotor of a driving motor is forcibly rotated; and
driving a driving motor upon such detection.

30. The method of claim 25, further comprising:
mounting at least one magnet at the rear surface of the display unit;
mounting a magnetic detecting sensor at the front surface of the body unit;
driving a driving motor when the magnetic detecting sensor does not detect a magnetic force of either of the at least one magnet; and
turning off the driving motor when the magnetic detecting sensor detects a magnetic force of either of the at least one magnet.

* * * * *